US007844647B2

(12) United States Patent
Abernethy, Jr. et al.

(10) Patent No.: US 7,844,647 B2
(45) Date of Patent: Nov. 30, 2010

(54) SYSTEM AND METHOD OF INFORMING USERS OF CHANGES IN GEOGRAPHICALLY BOUND RULES

(75) Inventors: Michael Negley Abernethy, Jr., Pflugerville, TX (US); Travis M. Grigsby, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 11/620,465

(22) Filed: Jan. 5, 2007

(65) Prior Publication Data

US 2008/0194269 A1 Aug. 14, 2008

(51) Int. Cl.
*G06F 17/30* (2006.01)
(52) U.S. Cl. .................................. 707/918; 707/802
(58) Field of Classification Search ................ 707/918, 707/919, 802
See application file for complete search history.

(56) References Cited

U.S. PATENT DOCUMENTS

| | | | | |
|---|---|---|---|---|
| 5,948,040 | A * | 9/1999 | DeLorme et al. ............ | 701/201 |
| 6,122,622 | A | 9/2000 | Wiitala et al. ................ | 705/28 |
| 6,321,158 | B1 * | 11/2001 | DeLorme et al. ............ | 701/201 |
| 6,501,421 | B1 | 12/2002 | Dutta et al. ............ | 342/357.13 |
| 6,810,328 | B2 | 10/2004 | Yokota et al. ................ | 701/210 |
| 6,839,707 | B2 | 1/2005 | Lee et al. ........................ | 707/8 |
| 6,842,774 | B1 | 1/2005 | Piccioni ....................... | 709/207 |
| 6,992,619 | B2 | 1/2006 | Harrison ................ | 342/357.13 |
| 2002/0194014 | A1 | 12/2002 | Starnes et al. .................. | 705/1 |
| 2003/0009345 | A1 | 1/2003 | Thorpe .......................... | 705/1 |
| 2003/0055697 | A1 | 3/2003 | Macken, Jr. et al. ............ | 705/7 |
| 2003/0135520 | A1 | 7/2003 | Mitchell et al. ............. | 707/200 |
| 2004/0024775 | A1 | 2/2004 | Kemp .......................... | 707/102 |
| 2004/0073498 | A1 | 4/2004 | Breen et al. .................... | 705/27 |
| 2005/0203899 | A1 | 9/2005 | Anderson et al. .............. | 707/5 |
| 2005/0267658 | A1 | 12/2005 | Yuan et al. .................... | 701/36 |

OTHER PUBLICATIONS

Office Action for co-pending U.S. Appl. No. 11/620,457, mailed Oct. 6, 2009, 14 pages.
"CounterpartyLink and Siperian Join Forces to Link Critical Business Entity Reference Data Into Counterparty Hub." PR Newswire, Nov. 13, 2006.
Notice of Allowance for co-pending U.S. Appl. No. 11/620,457, mailed Apr. 29, 2010, 13 pages.

* cited by examiner

*Primary Examiner*—Cheryl Lewis
(74) *Attorney, Agent, or Firm*—VanLeeuwen & VanLeeuwen; Justin M. Dillon

(57) ABSTRACT

A system, method, and program product are provided that inform users of changes in geographically bound rules. This is performed by receiving, via a GPS device, a first geographic location. Identifying, based on the received first geographic location, a first geographic region, and retrieving a first set of geographically bound rules that correspond to the identified geographic region. After a period of time, a second geographic location is received and a second geographic region is identified based on the second geographic location. If the first geographic region is different than the second geographic region, then the system retrieves a second set of geographically bound rules corresponding to the identified geographic region. The first set of geographically bound rules is compared to the second set of geographically bound rules, resulting in one or more different geographically bound rules. The users are then informed of the different geographically bound rules.

20 Claims, 6 Drawing Sheets

SYSTEM AND METHOD OF INFORMING USERS OF CHANGES IN GEOGRAPHICALLY BOUND RULES

BACKGROUND OF THE INVENTION

1. Technical Field

The present invention relates to a system and method that informs users of changes in geographically bound rules. More particularly, the present invention relates to a system and method that retrieves geographically bound rules corresponding to a GPS-determined region occupied by the user as the user moves from one region to another.

2. Description of the Related Art

In today's global marketplace, employees or other business professionals are moving from one place to another for a variety of reasons. Modern transportation, such as airplanes, automobiles, and mass transit, allow business professionals to travel vast distances in a short amount of time. The ability to quickly move these vast distances allows business professionals to conduct business in a wide variety of locations, increasing the business's profit opportunities and allowing business professionals to meet with a wide assortment of people in order to help the business increase revenues and, in many cases, decrease operating expenses. The global marketplace allows business professionals to meet with foreign suppliers, vendors, clients, and customers faster and more frequently than in prior generations.

Increasing business professionals' abilities to travel quickly in the global marketplace is, however, not without challenges. One challenge faced by business professionals is the different laws applied by various governments. For example, antitrust concerns in some countries prohibit certain types of discussions that may be deemed anti-competitive, especially if a particular business has a certain level of dominance in that country or region. These same discussions may, however, be perfectly legal and acceptable in a different country either because of the laws of that country or because of the business's lack of dominance in that country.

Another challenge facing business professionals are restrictions placed on some business professionals due to travel documents, such as visas and passports, when traveling to a different country. Some countries may prohibit visitors traveling with certain travel documents to visit a particular area of the country or engage in a certain type of activity. For example, a visitor traveling on a student visa may be restricted to a geographic region surrounding a college or university that the visitor is attending. Other countries may prohibit visitors from traveling in areas deemed sensitive due to concerns such as national security or terrorism.

A further challenge facing business professionals are business, or organizational rules, that apply when the professional is in a particular geographic region. For example, because costs vary considerably between regions, the organization may have different spending limits, per diem amounts, approved hotels, and the like. Other rules, such as payment to government officials, gratuity amounts, and the like may also be considerably different from one location to the next. An awareness and understanding of the various national laws, travel restrictions, and organizational rules may be a daunting task, especially when a business professional is rapidly moving from one geographical location to the next.

SUMMARY

It has been discovered that the aforementioned challenges are resolved using a system, method and computer program product that informs users of changes in geographically bound rules. This is performed by receiving, via a GPS device, a first geographic location corresponding to one or more users, identifying, based on the received first geographic location, a first geographic region selected from the geographic regions, and retrieving a first set of geographically bound rules that correspond to the identified geographic region. After a period of time (e.g., after the users have changed locations), a second geographic location is received corresponding to the users. A second geographic region selected from the geographic regions is identified based on the second geographic location. If the first geographic region is different than the second geographic region, then the system retrieves a second set of geographically bound rules corresponding to the identified geographic region. The first set of geographically bound rules is compared to the second set of geographically bound rules, resulting in one or more different geographically bound rules. The users are then informed of the different geographically bound rules. Examples of geographically bound rules include rules such as regional laws, travel document restrictions, approved lodgings, allowed travel expenses, discussion rules, per diem amounts, and the like.

In one embodiment, the second set of geographically bound rules is displayed on a display device. In this embodiment, the different geographically bound rules are highlighted on the display device. In a further embodiment, geographically bound rules that are not included in the second set of geographically bound rules are identified (e.g., rules that applied to the first geographical region but not to the second geographical region). The geographically bound rules that no longer apply are then displayed on the display device.

In another embodiment, one or more user travel attributes that correspond to the users are retrieved with each of the users having a user identifier (e.g., a name, identification number, etc.). The retrieved user travel attributes are compared to rule attributes that correspond to one or more of the second set of geographically bound rules. Based on the comparison, one or more of the second set of geographically bound rules that apply to a first set of users is identified, and these rules and the corresponding user identifiers are displayed on the display device. In a further embodiment, the retrieved user travel attributes are compared to rule attributes that correspond to the different geographically bound rules and, based on the comparison, one or more different geographically bound rules that apply to a second set of users is identified. The identified different geographically bound rules that apply to the second set of users is then displayed on the display device.

In another embodiment, the different geographically bound rules are wirelessly transmitted from a server computer system to a client-based information handling system. The client-based information handling system includes a display device and includes such devices as personal digital assistants (PDA), mobile telephones, and portable computer systems. The different geographically bound rules are then displayed on the display device included with the client-based information handling system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
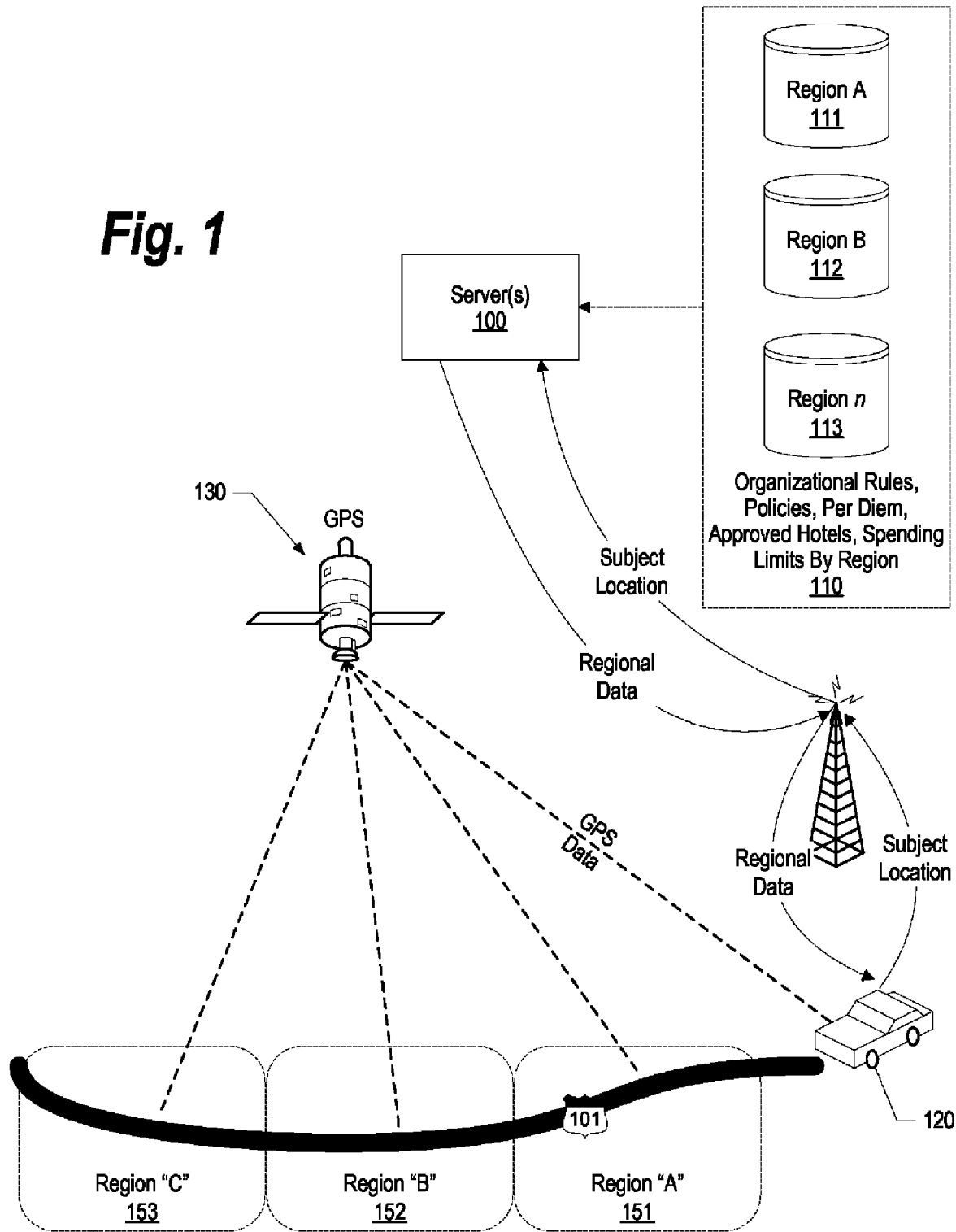
FIG. 1 is a high-level diagram showing components used to inform a user of changes in geographically bound rules as the user is moving between geographical regions.

FIG. 1 is a high-level diagram showing components used to inform a user of changes in geographically bound rules as the user is moving between geographical regions. User (or users) 120 have a geographical positioning receiver in a device, such as an automobile or portable information handling system, to receive GPS data from Geographic Position Satellites (GPS) 130 that pinpoints the user's geographic location. The current user location retrieved from GPS 130 is transmitted to one or more servers 100. In one embodiment, the current user location is wirelessly transmitted to servers 100 using a wireless transmission protocol, such as that used by a mobile or cellular telephone system.

Servers 100 identify a geographic region based on the received user location. The type of geographic regions can vary based on the application. For example, in an international application, a geographic region can be defined as a particular country and in an intra-national application a geographic region might be a state or province or an either smaller geographic region such as a county, city, town, or other local region. Moreover, a geographic region can include multiple types of regions. For example, if a user is located in Austin, Texas, the geographic region may include data pertaining to the country of the United States, the State of Texas, Travis County, and the City of Austin. Geographically bound rules correspond to the identified geographic region. Examples of geographically bound rules include laws, organizational rules and policies, per diem limits, approved hotels, expense limits, and any other rules that apply to a particular region. In the example of Austin, Texas, the user's organization may have prearranged agreements with various hotels located in Austin that provide a discount to the employee. In addition, the geographically bound rules may include a per diem amount or other expenses applicable to either Austin or to a larger geographical region, such as the State of Texas, that includes Austin.

Geographically bound rules can also include legal provisions. For example, one country may have enacted antitrust provisions or decrees that prohibit employees of certain large companies from discussing certain business arrangements. This may be especially true if the companies subject to the provisions or decrees are particularly dominant in the country or region. These same discussion restrictions may not apply in another country either because the other country has not enacted such provisions or decrees or because the companies are not in a dominant position that triggers such antitrust provisions.

Servers 100 retrieve the geographically bound rules that apply to the geographical region in which user 120 is located. The user's location is repeatedly sent to servers 100 as the user changes locations. In the example shown in FIG. 1, when the user moves to Region "A" (151), the server retrieves geographically bound rules 111 that apply to Region "A". Likewise, when the user moves from Region "A" (151) to Region "B" (152), the user retrieves geographically bound rules 112 that apply to Region "B". The user is informed of differences between the geographically bound rules that apply to the different regions. For example, if the per diem rate in Region "A" is $50 and the per diem rate in Region "B" is $60, then the user would be informed of this difference in geographically bound rules. In another example, if Region "A" does not allow employees to discuss exclusive contracts with representatives of a particular company, but Region "B" allows such discussions, this difference in geographically bound rules would also be displayed to the user. Similarly, as the user moves from Region "B" (152) to Region "C" (153), then geographically bound rules 113 that apply to Region "C" would be retrieved and compared with the geographically bound rules that applied to Region "B" and the differences would be provided to the user.

In one embodiment, servers 100 determine the geographically bound rules and the differences between different sets of geographically bound rules that apply to different regions and wirelessly transmit this information to user 120. The geographically bound rules and differences in sets of geographically bound rules is displayed to the user using an information handling system, such as a personal digital assistant (PDA), a mobile telephone, a mobile computer system, a computer system included in a vehicle being used by the user, or other type of information handling system. In another embodiment, servers 100 provide the different sets of geographically bound rules and the rules are stored on the user's information handling system. In this embodiment, the geographically bound rules and differences between sets of geographically bound rules can be determined without having to communicate with servers 100. This embodiment may be useful in applications where distances or terrain inhibit or prevent reliable wireless communication between user's information handling system 120 and servers 100. In a still further embodiment, the geographically bound rules (111 through 113) are stored on a nonvolatile storage device accessible to the user's information handling system, such as a hard drive. In this embodiment, server 100 is not used as the geographically bound rules are locally accessible to the user's information handling system. In addition, in this embodiment, the software used to compare the user's current geographic location with the various regions is also stored on the user's information handling system.

Figure 2:
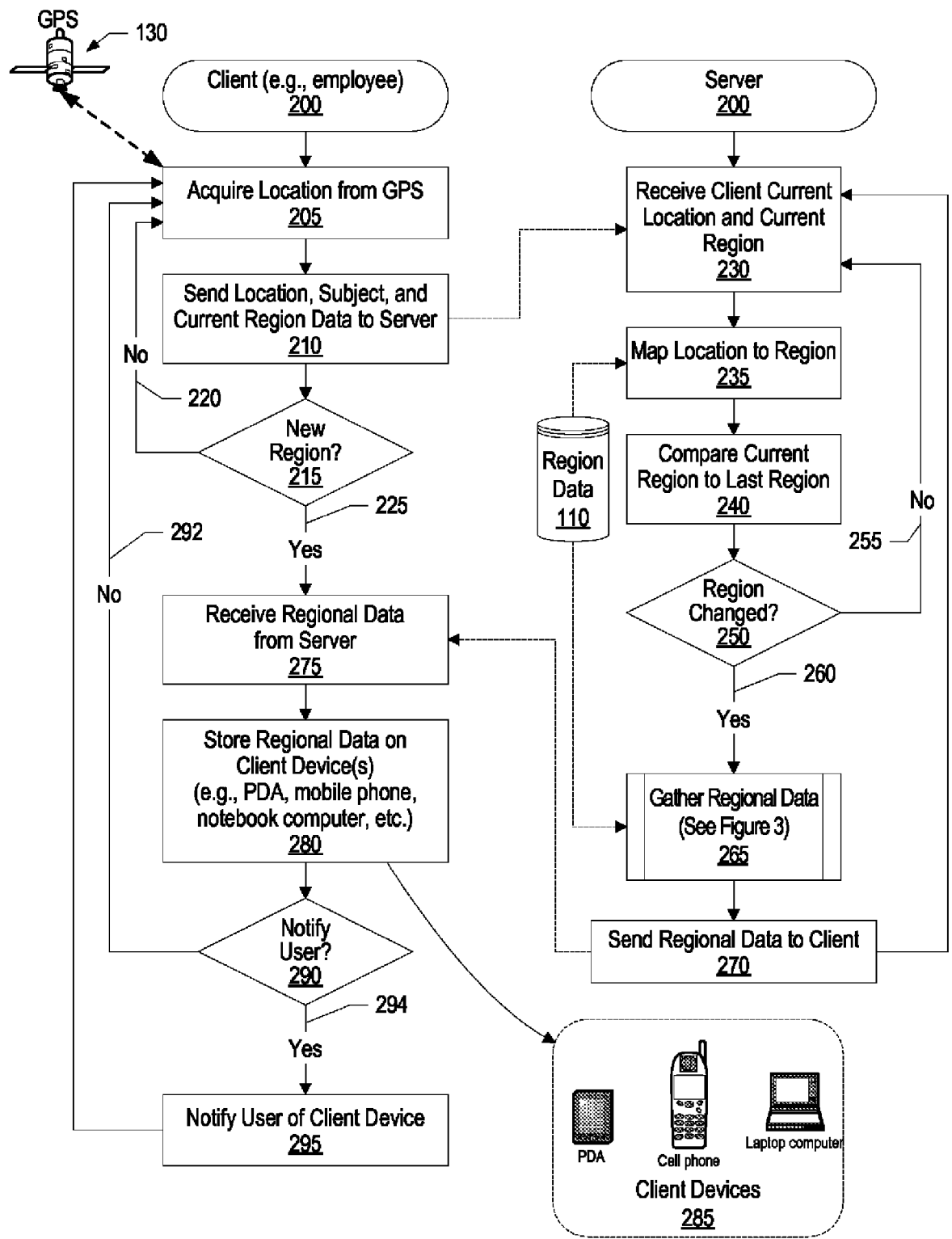
FIG. 2 is a flowchart showing the steps involved in informing a user of the changes in geographically bound rules as the user moves between geographical regions.

FIG. 2 is a flowchart showing the steps involved in informing a user of the changes in geographically bound rules as the user moves between geographical regions. User processing, such as that performed by the user's information handling system (e.g., computer system, notebook computer system, personal digital assistant (PDA), mobile telephone, etc.) commences at 200. At step 205, the user's information handling system acquires the geographic location of the information handling system (and, thus, the user), using a global positioning receiver device that receives global positioning satellite (GPS) data from various orbiting satellites. In one embodiment, the current location, along with identifiers of the user(s) and the user's last region are wirelessly transmitted to a server at step 210. In another embodiment, the processing shown commencing at 201 is also performed at the user's information handling system without wirelessly transmitting the data to one or more servers.

Server processing commences at 201 whereupon, at step 230, the server receives the user's current location that was wirelessly transmitted to the server. At step 235, the user's current region is identified based on the user's current location, and at step 240, the current region is compared with the user's last region. In one embodiment, the user's information handling system wirelessly transmitted the user's last region along with the user's current location, while in another embodiment, the server stores the last region for each user being served by the server and retrieves the last region from the server's storage. A determination is made as to whether the user's region has changed based on the comparison of the current region to the last region (decision 250). If the region has not changed, then decision 250 branches to "no" branch 255 which loops back and transmits a response to the user indicating that the user's region has not changed and prepares to receive the next user location from one of the users being served by the server.

Figure 3:
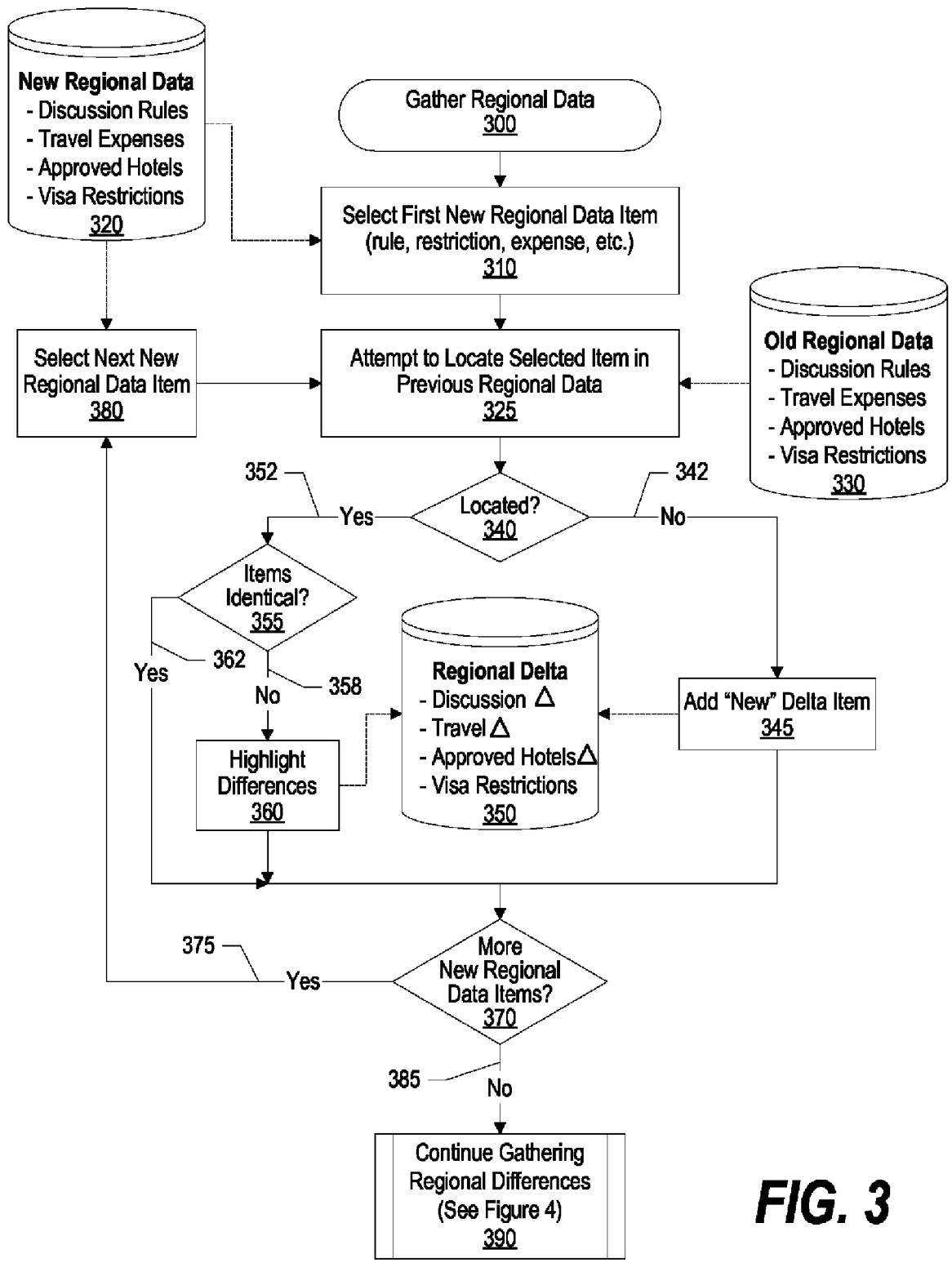
FIG. 3 is a flowchart showing the steps taken to gather regional data for a user and determine the difference in geographically bound rules.

Returning to decision 250, if the user's region has changed, then decision 250 branches to "yes" branch 260 whereupon, at predefined process 265, the server gathers regional data, including the geographically bound rules (see FIG. 3 and corresponding text for processing details). At step 270, the regional data, including the geographically bound rules, are wirelessly transmitted from the server back to the user. Server processing loops back to receive the next user location from one of the users that is being served by the server.

Returning to user processing, at step 212 the user's information handling system receives a response wirelessly transmitted to the user's information handling system from the server. A determination is made as to whether the user has entered a new region (decision 215). If the user has not entered a new region, then decision 215 branches to "no" branch 220 which loops back to re-acquire another GPS location and send the new location to the server. In one embodiment, GPS location data is re-acquired at step 205 when the user's information handling system is in motion. In another embodiment, step 205 is performed at a particular interval (e.g., every five minutes). This looping continues until decision 215 determines that the user has entered a different region, at which point decision 215 branches to "yes" branch 225.

When the user has entered a different, or new, region, decision 215 branches to "yes" branch 225 and, at step 275, the user's information handling system receives the regional data gathered by the server. This regional data includes the geographically bound rules that apply to the new region as well as the differences between the geographically bound rules that apply to the old region and the new region. At step 280, the received regional data, including the geographically bound rules and the differences in the geographically bound rules, are stored at the user's information handling system (e.g., on a nonvolatile storage device such as a hard drive accessible by the information handling system, etc.). The user can access and view the geographically bound rules and the differences in the geographically bound rules using the user's information handling system 285. Examples of user information handling systems include personal digital assistants (PDAs), mobile telephones, and computer systems including laptop, or notebook, computer systems.

A determination is made as to whether to notify the user, either based on the user entering a new geographical region or based on any particular geographically bound rules or differences in the geographically bound rules between the old region and the new region (decision 290). If the user is not to be notified, then decision 290 branches to "no" branch 292 which loops back to re-acquire the next GPS location data and re-determine if the user has entered a new region. On the other hand, if the user is to be notified, then user's information handling system 285 is used to notify the user of either the change in regions, of any particular geographically bound rules, or regarding any particular differences in the geographically bound rules. In one embodiment, an audible signal, such as a beep or chime, emanates from user's information handling system 285 in order to notify the user. After the user is notified, processing loops back to re-acquire the next GPS location data and re-determine if the user has entered a new region.

FIG. 3 is a flowchart showing the steps taken to gather regional data for a user and determine the difference in geographically bound rules. Processing commences at 300 whereupon, at step 310, the first new geographically bound rule is selected from database 320 that includes the geographically bound rules that apply to the new region. At step 325, the system attempts to locate the selected geographically bound rule in the list of geographically bound rules that applied to the user's previous geographical region (old regional database 330).

A determination is made as to whether the selected geographically bound rule was located in the previous regional database (decision 340). If the selected geographically bound rule was not located in the previous regional database, then decision 340 branches to "no" branch 342 whereupon, at step 342, a new item is added to regional delta data store 350 that is used to store geographically bound rules that are different in the new region. On the other hand, if the geographically bound rule was located in the previous regional database, then decision 340 branches to "yes" branch 352 whereupon a determination is made as to whether the geographically bound rules in the current and previous regional database are identical or are different (decision 355). For example, each regional database may include a geographically bound rule regarding per diem amounts, but the previous per diem amount may have been $50 per day and the new, current, regional database may include a per diem amount of $60. If the geographically bound rules are not identical, then decision 355 branches to "no" branch 358 whereupon, at step 360, the differences between the geographically bound rules are highlighted (e.g., highlighting the fact that the per diem amount has changed from $50/day to $60/day, etc.). On the other hand, if the geographically bound rules are identical, then decision 355 branches to "yes" branch 362 bypassing step 360.

After the selected geographically bound rule has been processed and any differences in the geographically bound rules has been included in regional delta (differences) database 350, a determination is made as to whether there are more geographically bound rules to process in the new regional database (decision 370). If there are more geographically bound rules to process, then decision 370 branches to "yes" branch 375 whereupon, at step 380, the next geographically bound rule is selected from new regional database 320 and processing loops back to step 325 to process the newly selected geographically bound rule. This looping continues until all geographically bound rules in the new regional database have been processed, at which point decision 370 branches to "no" branch 385 and the gathering of regional differences continues at predefined process 390 (see FIG. 4 and corresponding text for processing details).

Figure 4:
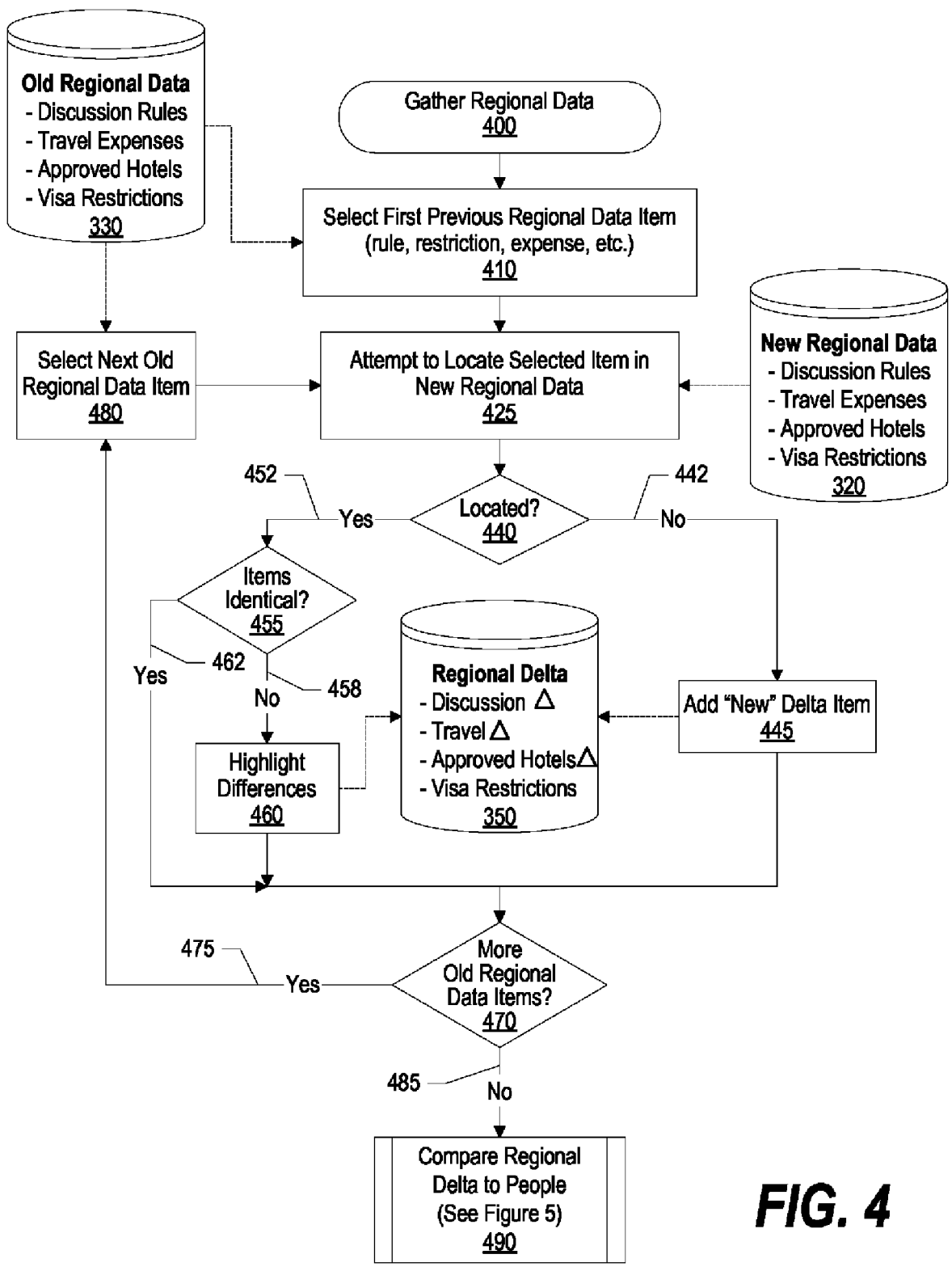
FIG. 4 is a further flowchart showing the steps taken to gather regional data for a user and determine the difference in geographically bound rules.

FIG. 4 is a further flowchart showing the steps taken to gather regional data for a user and determine the difference in geographically bound rules. In contrast to the steps shown in FIG. 3, in FIG. 4, the geographically bound rules in the old, or previous, region are processed and compared to the geographically bound rules in the new region. Processing commences at 400 whereupon, at step 410, the first previous geographically bound rule is selected from database 330 that includes the geographically bound rules that applied to the old (previous) region. At step 425, the system attempts to locate the selected geographically bound rule in the list of geographically bound rules that applied to the user's new geographical region (new regional database 320).

A determination is made as to whether the selected geographically bound rule was located in the new regional database (decision 440). If the selected geographically bound rule was not located in the new regional database, then decision 440 branches to "no" branch 442 whereupon, at step 442, a new item is added to regional delta data store 350 that is used to store geographically bound rules that are different in the new region. On the other hand, if the geographically bound rule was located in the new regional database, then decision 440 branches to "yes" branch 452 whereupon a determination is made as to whether the geographically bound rules in the current and previous regional database are identical or are different (decision 455). If the geographically bound rules are not identical, then decision 455 branches to "no" branch 458 whereupon, at step 460, the differences between the geographically bound rules are highlighted. On the other hand, if the geographically bound rules are identical, then decision 455 branches to "yes" branch 462 bypassing step 460.

After the selected geographically bound rule has been processed and any differences in the geographically bound rules has been included in regional delta (differences) database 350, a determination is made as to whether there are more geographically bound rules to process in the old regional database (decision 470). If there are more geographically bound rules to process, then decision 470 branches to "yes" branch 475 whereupon, at step 480, the next geographically bound rule is selected from old regional database 330 and processing loops back to step 425 to process the newly selected geographically bound rule. This looping continues until all geographically bound rules in the old regional database have been processed, at which point decision 470 branches to "no" branch 485. At predefined process 490, the regional difference stored in regional differences database 350 are compared to one or more user attributes (see FIG. 5 and corresponding text for processing details).

Figure 5:
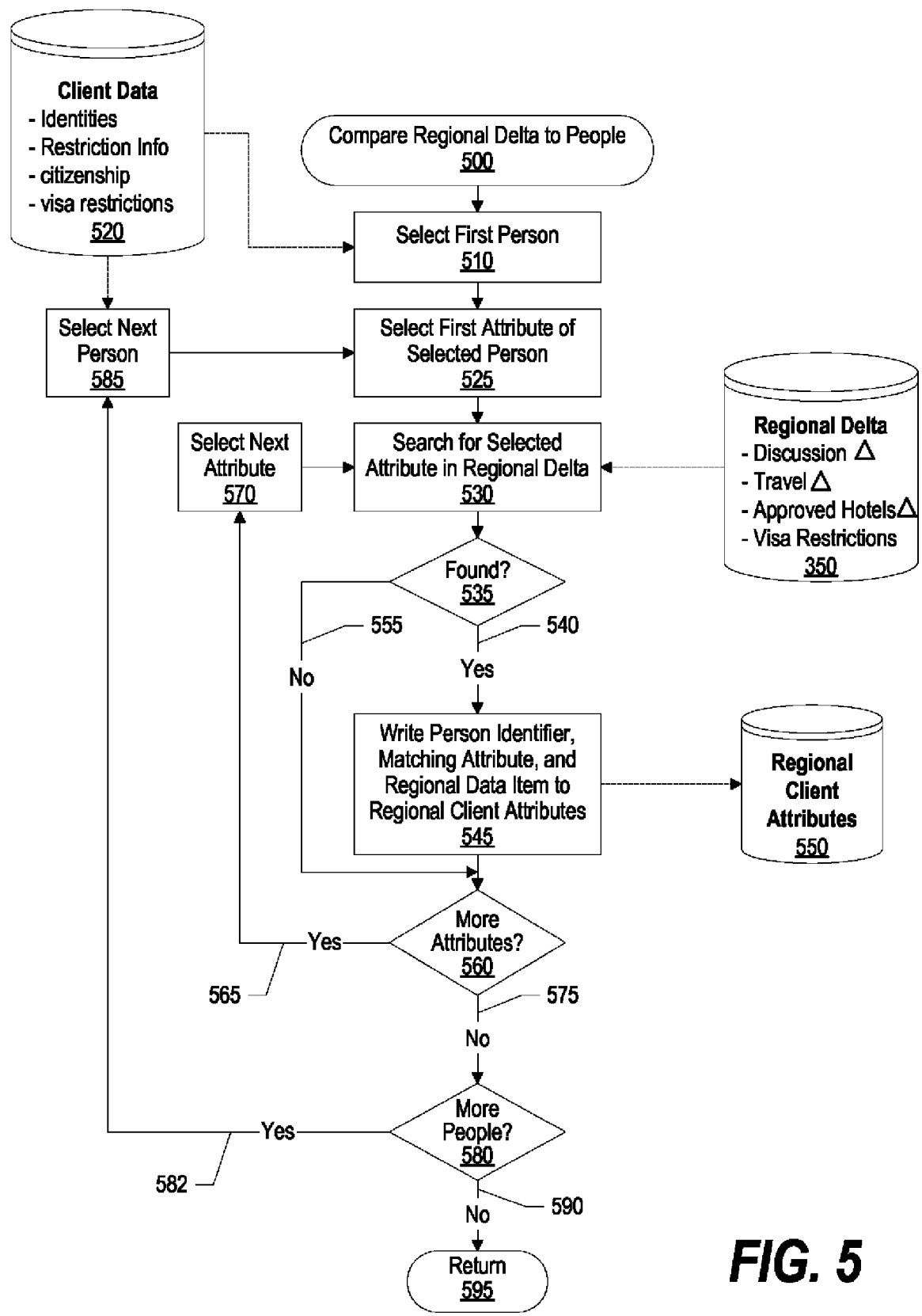
FIG. 5 is a flowchart showing the steps taken to compare geographical bound rules to restrictions applying to a set of individual travelers.

FIG. 5 is a flowchart showing the steps taken to compare geographical bound rules to restrictions applying to a set of individual travelers. Processing commences at 500 whereupon, at step 510, the first user is selected from user database 520. User database 520 includes identifiers of one or more users (e.g., user names, etc.), restriction data that applies to the users, including citizenship restriction data, and travel document restrictions. These various restrictions are attributes of the various users, so that an individual user can have more than one attribute with each of the attributes corresponding to a different restriction that may match a geographically bound rule.

At step 525, the first attribute for the selected user is selected. At step 530, new regional database 320 and regional differences database 350 are searched in an attempt to locate one or more geographically bound rules that matches the selected attribute. A determination is made as to whether the attempt to find matching geographically bound rules was successful (decision 535). If the search was successful, then decision 535 branches to "yes" branch 540 whereupon, at step 545, the user's identifier, the matching user attribute, and the geographically bound rules found to match the attribute are written to regional user attributes database 550. On the other hand, if no geographically bound rules are found in either new regional database 320 or regional differences database 350, then decision 535 branches to "no" branch 555 bypassing step 545.

A determination is made as to whether there are more attributes that apply to the selected user (decision 560). If there are more attributes that apply to the selected user, then decision 560 branches to "yes" branch 565 whereupon, at step 570, the next attribute is selected for the currently selected user and processing loops back to process the newly selected attribute against the geographically bound rules in new regional database 320 and the geographically bound rules in regional differences database 350. This looping continues until all attributes for the selected user have been processed, at which point, decision 560 branches to "no" branch 575.

A determination is made as to whether there are more users to process (decision 580). If there are more users to process, then decision 580 branches to "yes" branch 582 whereupon, at step 585, the next user is selected from user database 520 and processing loops back to process the newly selected user's attributes against the geographically bound rules in new regional database 320 and the geographically bound rules in regional differences database 350. This looping continues until all the users in user database 520 have been processed, at which point decision 580 branches to "no" branch 588.

At step 590, the geographically bound rules are displayed to the user or users. The geographically bound rules include the geographically bound rules included in new regional database 320 of the rules that apply to the user's new region, different geographically bound rules from differences database 350, and regional user attributes that detail geographically bound rules that apply to various users based on attributes, such as citizenship or visa restrictions, that apply to the users. In addition, differences between the new geographically bound rules and the old geographically bound rules are highlighted to the user. Processing thereafter ends at 595.

Figure 6:
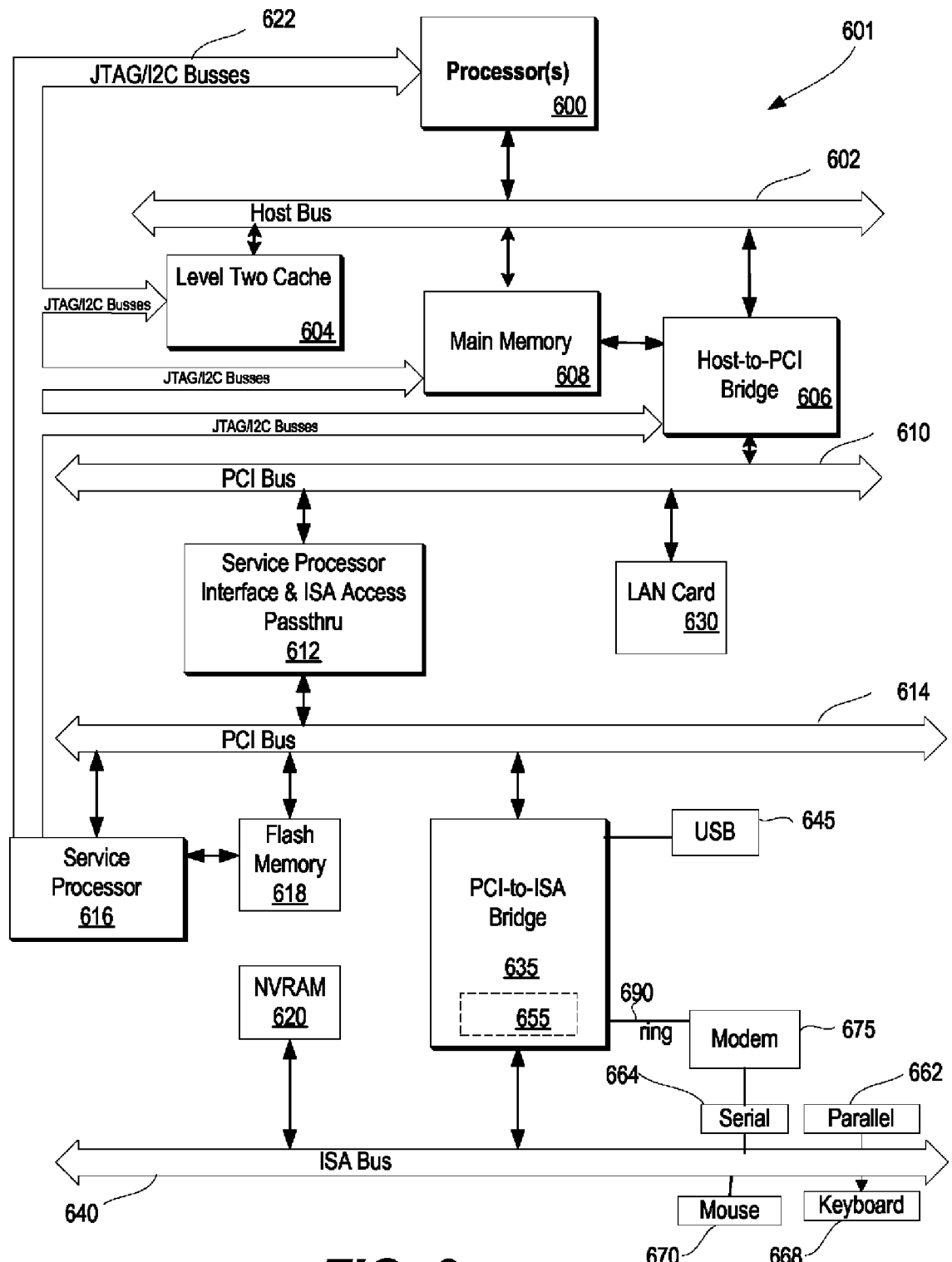
FIG. 6 is a block diagram of a data processing system in which the methods described herein can be implemented.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

One of the preferred implementations of the invention is a software application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of informing users of changes in geographically bound rules, said method comprising:

receiving, via a GPS device, a first geographic location corresponding to one or more users, wherein each of the users is retained by a common organization, wherein the organization imposes a plurality of travel restrictions on its retained users, and wherein the travel restrictions include a plurality of geographically bound rules;

identifying, based on the received first geographic location, a first geographic region selected from a plurality of geographic regions;

retrieving a first plurality of geographically bound rules corresponding to the first geographic region, wherein the first plurality of geographically bound rules comprise a first set of one or more requirements imposed on the users by the organization while the users are within the first geographic region;

receiving, via the GPS device, a second geographic location corresponding to the users;

identifying, based on the received second geographic location, a second geographic region selected from the plurality of geographic regions;

determining that the first geographic region is different than the second geographic region;

in response to the determination:
retrieving a second plurality of geographically bound rules corresponding to the second geographic region, wherein the second plurality of geographically bound rules comprise a second set of one or more requirements imposed on the users by the organization while the users are within the second geographic region;

comparing the first plurality of geographically bound rules to the second plurality of geographically bound rules, the comparing resulting in one or more different geographically bound rules being imposed by the organization; and informing one or more of the users of the one or more different geographically bound rules.

2. The method of claim 1 wherein the informing further comprises:

displaying the second plurality of geographically bound rules on a display device; and highlighting the one or more different geographically bound rules on the display device.

3. The method of claim 2 further comprising:

identifying one or more removed geographically bound rules as one or more of the first plurality of geographically bound rules that are not included in the second plurality of geographically bound rules; and displaying the one or more removed geographically bound rules on the display device.

4. The method of claim 1 further comprising:

retrieving one or more user travel attributes corresponding to the one or more users, wherein each of the users includes a user identifier, and wherein at least one of the users is retained by the organization in an employer-employee relationship;

comparing the retrieved user travel attributes to one or more rule attributes that correspond to one or more of the second plurality of geographically bound rules;

identifying, based on the comparing, one or more of the second plurality of geographically bound rules that apply to a first set of users that includes at least one of the users; and displaying the identified geographically bound rules that apply to the first set of users along with the user identifiers of the users included in the first set of users.

5. The method of claim 4 further comprising:

comparing the retrieved user travel attributes to one or more rule attributes that correspond to at least one of the one or more different geographically bound rules;

identifying, based on the comparing, one or more of the one or more different geographically bound rules that apply to a second set of users that includes at least one of the users; and displaying the identified different geographically bound rules that apply to the second set of users along with the user identifiers of the users included in the second set of users.

6. The method of claim 1 wherein the informing further comprises:

wirelessly transmitting the different geographically bound rules from a server computer system to a client-based information handling system, wherein the client-based information handling system includes a display device and wherein the client-based information handling system is selected from a group consisting of a personal digital assistant (PDA), a mobile telephone, and a portable computer system; and displaying the different geographically bound rules on the display device included with the client-based information handling system.

7. The method of claim 1 wherein the geographically bound rules are selected from the group consisting of one or more regional laws, one or more travel document restrictions, one or more approved lodgings, one or more travel expense categories, one or more discussion rules, and a per diem amount.

8. A information handling system comprising:

one or more processors;

a memory accessible by at least one of the processors;

a nonvolatile storage area accessible by at least one of the processors;

a display device accessible by at least one of the processors;

a wireless network interface adapter connecting the information handling system to a computer network; and a set of instructions stored in the memory, wherein one or more of the processors executes the set of instructions in order to perform actions of:

receiving, via a GPS device, a first geographic location corresponding to the information handling system, wherein the information handling system is in proximity to one or more users who are retained by an organization, wherein the organization imposes a plurality of travel restrictions on its retained users, and wherein the travel restrictions include a plurality of geographically bound rules;

identifying, based on the received first geographic location, a first geographic region selected from a plurality of geographic regions;

retrieving a first plurality of geographically bound rules corresponding to the first geographic region, wherein the first plurality of geographically bound rules comprise a first set of one or more requirements imposed on the users by the organization while the users are within the first geographic region;

receiving, via the GPS device, a second geographic location corresponding to the information handling system;

identifying, based on the received second geographic location, a second geographic region selected from the plurality of geographic regions;

determining that the first geographic region is different than the second geographic region;

in response to the determination:

retrieving a second plurality of geographically bound rules corresponding to the second geographic region, wherein the second plurality of geographically bound rules comprise a second set of one or more requirements imposed on the users by the organization while the users are within the second geographic region;

comparing the first plurality of geographically bound rules to the second plurality of geographically bound rules, the comparing resulting in one or more different geographically bound rules; and displaying the one or more different geographically bound rules on the display device.

9. The information handling system of claim 8 wherein the wherein the set of instructions that perform the action of informing perform further actions comprising:

displaying the second plurality of geographically bound rules on the display device; and highlighting the one or more different geographically bound rules on the display device.

10. The information handling system of claim 9 wherein the set of instructions perform further actions comprising:

identifying one or more removed geographically bound rules as one or more of the first plurality of geographically bound rules that are not included in the second plurality of geographically bound rules; and displaying the one or more removed geographically bound rules on the display device.

11. The information handling system of claim 8 wherein the set of instructions perform further actions comprising:

retrieving one or more user travel attributes corresponding to the one or more users, wherein each of the users includes a user identifier, and wherein at least one of the users is retained by the organization in an employer-employee relationship;

comparing the retrieved user travel attributes to one or more rule attributes that correspond to one or more of the second plurality of geographically bound rules;

identifying, based on the comparing, one or more of the second plurality of geographically bound rules that apply to a first set of users that includes at least one of the users; and displaying, on the display device, the identified geographically bound rules that apply to the first set of users along with the user identifiers of the users included in the first set of users.

12. The information handling system of claim 11 wherein the set of instructions perform further actions comprising:

comparing the retrieved user travel attributes to one or more rule attributes that correspond to at least one of the one or more different geographically bound rules;

identifying, based on the comparing, one or more of the one or more different geographically bound rules that apply to a second set of users that includes at least one of the users; and displaying, on the display device, the identified different geographically bound rules that apply to the second set of users along with the user identifiers of the users included in the second set of users.

13. The information handling system of claim 8 wherein the set of instructions that perform the action of informing perform further actions comprising:
receiving a wireless transmission at the wirelessly network adapter from a server computer system connected to the computer network, the wireless transmission including the different geographically bound rules, wherein the information handling system includes is selected from a group consisting of a personal digital assistant (PDA), a mobile telephone, and a portable computer system; and
displaying the different geographically bound rules on the display device.

14. A computer program product stored in a computer readable medium, comprising functional descriptive material that, when executed by an information handling system, causes the information handling system to perform actions that include:
receiving, via a GPS device, a first geographic location corresponding to one or more users, wherein each of the users is retained by a common organization, wherein the organization imposes a plurality of travel restrictions on its retained users, and wherein the travel restrictions include a plurality of geographically bound rules;
identifying, based on the received first geographic location, a first geographic region selected from a plurality of geographic regions;
retrieving a first plurality of geographically bound rules corresponding to the first geographic region, wherein the first plurality of geographically bound rules comprise a first set of one or more requirements imposed on the users by the organization while the users are within the first geographic region;
receiving, via the GPS device, a second geographic location corresponding to the users;
identifying, based on the received second geographic location, a second geographic region selected from the plurality of geographic regions;
determining that the first geographic region is different than the second geographic region;
in response to the determination:
retrieving a second plurality of geographically bound rules corresponding to the second geographic region, wherein the second plurality of geographically bound rules comprise a second set of one or more requirements imposed on the users by the organization while the users are within the second geographic region;
comparing the first plurality of geographically bound rules to the second plurality of geographically bound rules, the comparing resulting in one or more different geographically bound rules; and
informing one or more of the users of the one or more different geographically bound rules.

15. The computer program product of claim 14 wherein the informing further comprises additional functional descriptive material that causes the information handling system to perform additional actions comprising:
displaying the second plurality of geographically bound rules on a display device; and
highlighting the one or more different geographically bound rules on the display device.

16. The computer program product of claim 15 wherein the functional descriptive material causes the information handling system to perform further actions comprising:
identifying one or more removed geographically bound rules as one or more of the first plurality of geographically bound rules that are not included in the second plurality of geographically bound rules; and
displaying the one or more removed geographically bound rules on the display device.

17. The computer program product of claim 14 wherein the functional descriptive material causes the information handling system to perform further actions comprising:
retrieving one or more user travel attributes corresponding to the one or more users, wherein each of the users includes a user identifier, and wherein at least one of the users is retained by the organization in an employer-employee relationship;
comparing the retrieved user travel attributes to one or more rule attributes that correspond to one or more of the second plurality of geographically bound rules;
identifying, based on the comparing, one or more of the second plurality of geographically bound rules that apply to a first set of users that includes at least one of the users; and
displaying the identified geographically bound rules that apply to the first set of users along with the user identifiers of the users included in the first set of users.

18. The computer program product of claim 17 wherein the functional descriptive material causes the information handling system to perform further actions comprising:
comparing the retrieved user travel attributes to one or more rule attributes that correspond to at least one of the one or more different geographically bound rules;
identifying, based on the comparing, one or more of the one or more different geographically bound rules that apply to a second set of users that includes at least one of the users; and
displaying the identified different geographically bound rules that apply to the second set of users along with the user identifiers of the users included in the second set of users.

19. The computer program product of claim 14 wherein the informing further comprises additional functional descriptive material that causes the information handling system to perform additional actions comprising:
wirelessly transmitting the different geographically bound rules from a server computer system to a client-based information handling system, wherein the client-based information handling system includes a display device and wherein the client-based information handling system is selected from a group consisting of a personal digital assistant (PDA), a mobile telephone, and a portable computer system; and
displaying the different geographically bound rules on the display device included with the client-based information handling system.

20. The computer program product of claim 14 wherein the geographically bound rules are selected from the group consisting of one or more regional laws, one or more travel document restrictions, one or more approved lodgings, one or more travel expense categories, one or more discussion rules, and a per diem amount.

* * * * *